O. NESTERUD.
QUACK GRASS DESTROYER.
APPLICATION FILED MAY 5, 1917.

1,258,930.

Patented Mar. 12, 1918.

INVENTOR
Oscar Nesterud
BY his ATTORNEY
A. M. Carlsen

UNITED STATES PATENT OFFICE.

OSCAR NESTERUD, OF STORDEN, MINNESOTA.

QUACK-GRASS DESTROYER.

1,258,930.

Specification of Letters Patent.   Patented Mar. 12, 1918.

Application filed May 5, 1917.   Serial No. 166,699.

*To all whom it may concern:*

Be it known that I, OSCAR NESTERUD, a citizen of the United States, residing at Storden, in the county of Cottonwood and State of Minnesota, have invented a new and useful Quack-Grass Destroyer, of which the following is a specification.

My invention relates to quack grass destroyers, and the object is to provide an effective machine for eliminating quack grass and similar weeds from a field.

Figure 1:
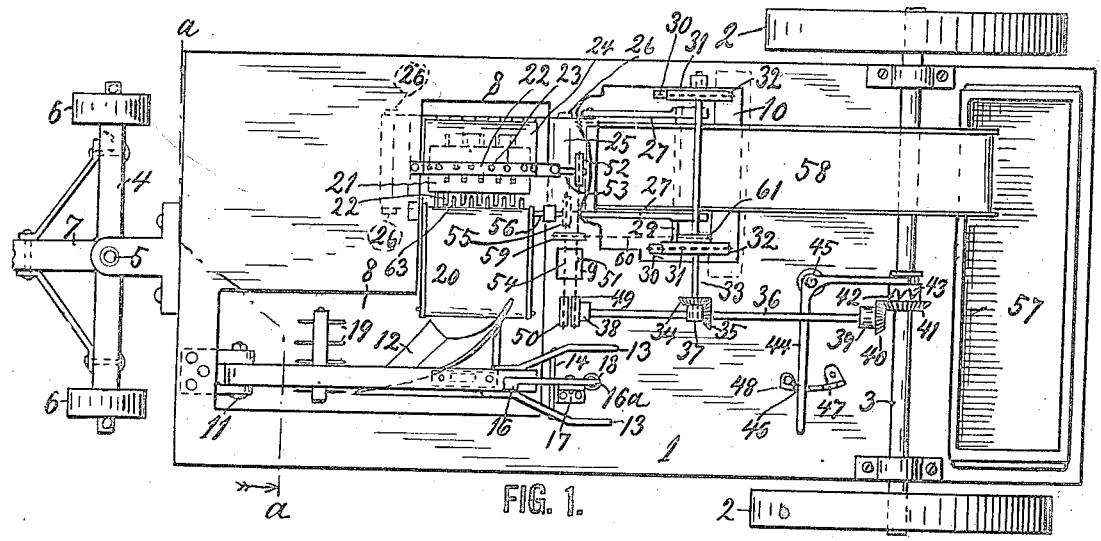
Figure 2:
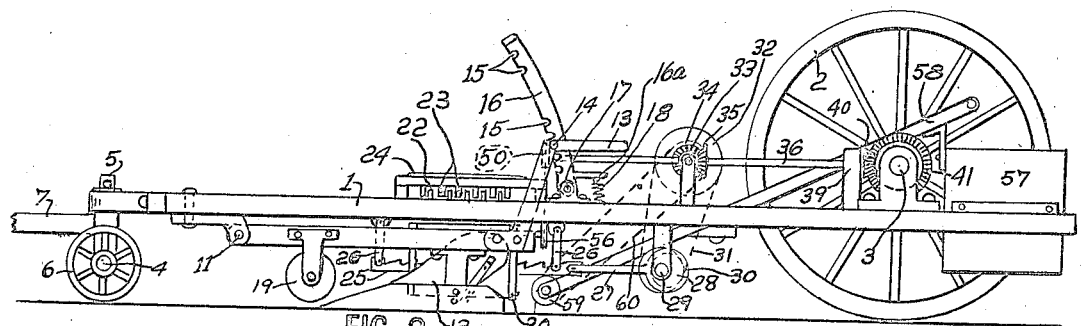
Figure 3:
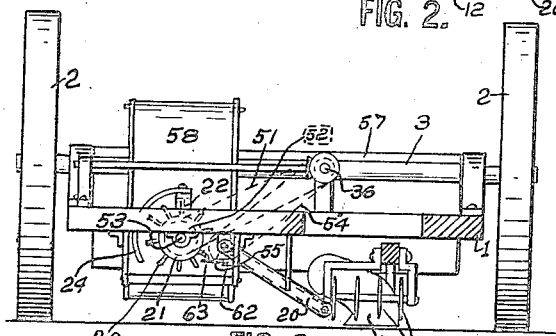
Figure 5:
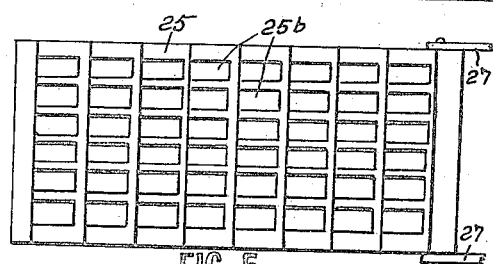
Figure 4:
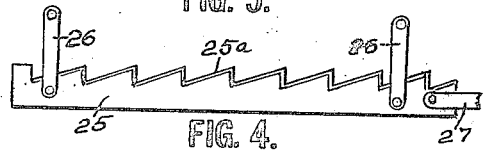

In the accompanying drawing:

Figure 1 is a top or plan view of my machine in a form adapted to be drawn by horses. Fig. 2 is a side elevation of Fig. 1 with one of the rear ground wheels removed and a few parts obstructed or omitted because they are clear in other views. Fig. 3 is a section on the line *a—a* in Fig. 1, with some parts omitted. Fig. 4 is a detail side view of the shaker device of the machine, and the parts suspending and operating it. Fig. 5 is a top view of Fig. 4 with the supporting links removed.

Referring to the drawing by reference numerals, 1 designates the main frame of the machine. It is supported by a pair of rear ground wheels 2 and an axle 3, which is rotated by at least one of the said wheels. The front end of the frame is supported by a front axle 4, which is pivoted at 5 to swing in a horizontal plane and is provided with steering wheels 6 and a draft pole 7.

The frame or platform is provided with several apertures 8, 9 and 10 through which machinery above and below the platform may project or be connected.

In the front part of the frame is hitched at 11 a plow 12, having handles 13 by which a person standing on the frame may raise and lower the plow. Between said handles is a cross bar 14 adapted for engagement in notches 15 of a segment 16, which is pivoted at 17 and by a spring 18 is at all times held against the bar 14 so that the plow may be set at various depths when the bar is in one of the lower notches 15 and will be clear above the ground when the bar is in one of the upper notches 15. To lower the plow the operator may grasp both handles and disengage the segment by stepping on the arm 16ᵃ of it.

The plow is provided with a series of colters 19 by which the furrow being plowed up is slit into narrow strips. Said strips are delivered by the plow upon a transversely arranged endless conveyer 20, which delivers the sod to an outwardly toothed cylinder 21, close above which there is a fixed rake 22, having teeth 23 between which the teeth of the roller pass and thereby crush and grind the sod as the latter passes over the top of the roller.

Secured to said rake, or to other parts of the frame, is a shield 24 which insures a downward course of the ground sod so it will drop upon a shaker 25, which is suspended by links or hangers 26 and reciprocated at a suitably fast speed by eccentric rods 27 from eccentrics 28, fixed on a shaft 29, the latter having sprockets 30 driven by chains 31 from larger sprockets 32, which are fixed on a shaft 33; the latter shaft having a bevel gear 34 driven by a bevel gear 35 which is fixed on a shaft 36. The latter shaft is journaled at 37, 38, 39 in longitudinal direction of the machine and has a bevel gear 40 in mesh with a bevel gear 41, which is loose on the rear axle 3 but is provided with a clutch member 42 ready to be engaged by a clutch member 43 which is slidably keyed on the axle and controlled by a shifter lever 44, fulcrumed at 45 and arranged to be engaged alternately in either one of two notches, 46, 47, of a segment 48, so as to hold the clutch in or out of action as may be desired.

Fixed on the shaft 36 are also two other sprockets 49 and 50. Sprocket 49 has a chain 51 driving a sprocket 52 fixed on the shaft 53 of the cylinder 21, and sprocket 50 has a chain 54 driving a sprocket 55 fixed on the upper shaft 56 of the conveyer 20.

Upon the rear end of the frame is a receptacle 57 into which the quack grass and its roots, after being separated from the soil by the shaker, are delivered by an endless conveyer 58, whose lower end has a sprocket 59 driven by a chain 60 from a sprocket 61 fixed on the shaft 33.

In Figs. 4 and 5 is indicated that the shaker may preferably be made up of a wooden frame 25 and a corrugated and perforated metal sheet 25ᵃ, whose corrugations being inclined will work the roots and grass of the weed along onto the conveyer 58 while the sand and earth drop down through the apertures 25ᵇ and into the trench formed by the plowing of the previous furrow.

When the receptacle 57 gets full or the field cleared of the weed, the contents of the receptacle are removed from it and destroyed by fire or other means.

In Fig. 3 is shown how a fixed rake or stripper 62, having teeth 63, may be arranged below the conveyer 20 for the purpose of preventing the roller from carrying the weeds upward again from the shaker.

What I claim is:

In a machine of the class described, an elongated frame adapted to be drawn by one end, wheels supporting the frame, and an axle rotated by one or more of the wheels, a receptacle mounted on the rear end of the frame, an endless inclined conveyer arranged to convey the weeds rearwardly and into the receptacle, a shaker above the lower end of the conveyer, a toothed cylinder mounted above the shaker with its axis in longitudinal direction of the frame, a second endless inclined conveyer arranged to carry sod in transverse direction of the frame to the toothed cylinder, a plow in the front end of the frame arranged to plow up and deliver sod laterally upon the transversely moving conveyer, and operative connection between the rotated axle and the cylinder, the shaker and the two conveyers.

In testimony whereof I affix my signature.

OSCAR NESTERUD.